US008605472B2

(12) United States Patent
Hurych et al.

(10) Patent No.: US 8,605,472 B2
(45) Date of Patent: Dec. 10, 2013

(54) BUCK-BOOST RECTIFIER, REFRIGERATION SYSTEM INCLUDING A BUCK-BOOST RECTIFIER, AND METHOD OF PROVIDING POWER TO A REFRIGERATION UNIT VIA A BUCK-BOOST RECTIFIER

(75) Inventors: Arnost Hurych, Prague (CZ); Vladimir Kmoch, Prague (CZ)

(73) Assignee: Thermo King Corporation, Minneapolis, MN (US)

( * ) Notice: Subject to any disclaimer, the term of this patent is extended or adjusted under 35 U.S.C. 154(b) by 167 days.

(21) Appl. No.: 13/271,301

(22) Filed: Oct. 12, 2011

(65) Prior Publication Data

US 2013/0091872 A1 Apr. 18, 2013

(51) Int. Cl.
*H02M 7/217* (2006.01)

(52) U.S. Cl.
USPC .......................................... 363/127

(58) Field of Classification Search
USPC .................................. 363/70, 127
See application file for complete search history.

(56) References Cited

U.S. PATENT DOCUMENTS

| | | | |
|---|---|---|---|
| 4,390,939 A | 6/1983 | Sugawara | |
| 4,884,185 A | 11/1989 | Hubert | |
| 5,307,004 A | 4/1994 | Carsten | |
| 5,680,301 A | 10/1997 | Oughton, Jr. et al. | |
| 5,808,452 A | 9/1998 | Gyugyi et al. | |
| 6,005,787 A | 12/1999 | Mizukoshi | |
| 6,587,362 B1 | 7/2003 | Vithayathil | |
| 6,622,505 B2 | 9/2003 | Anderson et al. | |
| 7,167,383 B2 | 1/2007 | Iwakura et al. | |
| 7,190,143 B2 | 3/2007 | Wei et al. | |
| 7,737,647 B2 | 6/2010 | Andrejak et al. | |
| 2005/0034449 A1* | 2/2005 | Frieden et al. | 60/284 |
| 2007/0040534 A1* | 2/2007 | Ghosh et al. | 323/207 |
| 2007/0070660 A1 | 3/2007 | Tallam | |
| 2008/0031019 A1* | 2/2008 | Alexander | 363/37 |
| 2010/0027304 A1 | 2/2010 | Wang et al. | |

FOREIGN PATENT DOCUMENTS

| | | |
|---|---|---|
| CH | 698918 | 12/2009 |
| JP | 60200768 | 10/1985 |
| JP | 200324852 | 11/2000 |

(Continued)

OTHER PUBLICATIONS

Borges et al., A Single Stage Buck-Boost Three-Phase Rectifier with High Power Factor Operating in Continous Conduction Mode, May 2011, IEEE ISCAS 2011, 2777-2780.*

(Continued)

*Primary Examiner* — Jue Zhang
(74) *Attorney, Agent, or Firm* — Michael Best & Friedrich LLP (57) ABSTRACT

A buck/boost rectifier. The rectifier is connectable to an alternating current power source and includes an upper bus, a lower bus, an upper rectifier, a lower rectifier, a pulse-width-modulation (PWM) controller, a phase-angle (PA) controller, and a capacitor. The upper rectifier is coupled to the upper bus, and the lower rectifier is coupled in a series-type relationship with the upper rectifier and to the lower bus. The PWM controller is coupled to the lower rectifier and is configured to boost a direct current (DC) voltage output by the rectifier. The PA controller is coupled to the lower rectifier and is configured to buck the DC voltage output by the rectifier. The capacitor is coupled between the upper bus and the lower bus.

20 Claims, 9 Drawing Sheets

(56) References Cited

FOREIGN PATENT DOCUMENTS

| | | |
|---|---|---|
| JP | 2001069761 | 3/2001 |
| JP | 2002125377 | 4/2002 |
| JP | 2002315345 | 10/2002 |
| JP | 2003289671 | 10/2003 |
| JP | 2004180422 | 6/2004 |
| JP | 2009095075 | 4/2009 |
| WO | 9423354 | 10/1994 |

OTHER PUBLICATIONS

PCT/US2012/052484 International Search Report and Written Opinion dated Jan. 31, 2013 (8 pages).

* cited by examiner

BUCK-BOOST RECTIFIER, REFRIGERATION SYSTEM INCLUDING A BUCK-BOOST RECTIFIER, AND METHOD OF PROVIDING POWER TO A REFRIGERATION UNIT VIA A BUCK-BOOST RECTIFIER

BACKGROUND

The invention relates to a buck-boost rectifier, specifically a three-phase pulse width modulated (PWM) rectifier incorporating both buck and boost properties.

Three-phase PWM rectifiers convert three-phase alternating current (AC) power into direct current (DC) power. The voltage of the DC power can be boosted and exceed the voltage of the AC power.

In vehicle refrigeration systems, three-phase PWM rectifiers are used to convert AC power received from an alternator into DC power to power the refrigeration system. The voltage of the AC power received from the alternator varies based on the speed of the alternator. Under most circumstances, it is necessary to boost the DC voltage. However, under certain circumstances, the AC voltage can be greater than the desired DC voltage. Under these circumstances, power is generally disconnected from the refrigeration system to prevent damaging the system.

SUMMARY

The three-phase PWM rectifier of the invention incorporates a novel buck circuit. The buck circuit enables the three-phase PWM rectifier to reduce the DC voltage generated, and allows DC power to be provided to the refrigeration system continuously, regardless of the magnitude of AC voltage provided by the alternator and without completely disconnecting power to the refrigeration system.

In one embodiment, the invention provides a buck/boost rectifier. The rectifier is connectable to an alternating current power source, and includes an upper bus, a lower bus, an upper rectifier, a lower rectifier, a pulse-width-modulation (PWM) controller, a phase-angle (PA) controller, and a capacitor. The upper rectifier is coupled to the upper bus, and the lower rectifier is coupled in a series-type relationship with the upper rectifier and to the lower bus. The PWM controller is coupled to the lower rectifier and is configured to boost a direct current (DC) voltage output by the rectifier. The PA controller is coupled to the lower rectifier and is configured to buck the DC voltage output by the rectifier. The capacitor is coupled between the upper bus and the lower bus.

In another embodiment, the invention provides a method of providing DC power to a refrigeration unit. The method includes receiving three-phase AC power from a belt-driven alternator, rectifying the AC power into DC power, boosting the DC power when the AC power is not sufficient to produce DC power having a voltage that exceeds a threshold by rectifying alone, and bucking the DC power when the AC power has a magnitude which would produce a DC voltage that exceeds a second threshold when rectified alone.

Other aspects of the invention will become apparent by consideration of the detailed description and accompanying drawings.

BRIEF DESCRIPTION OF THE DRAWINGS

FIGS. 6aA and 6b show the operation of a full-controlled buck/boost rectifier operating in a buck mode with phase angle control.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
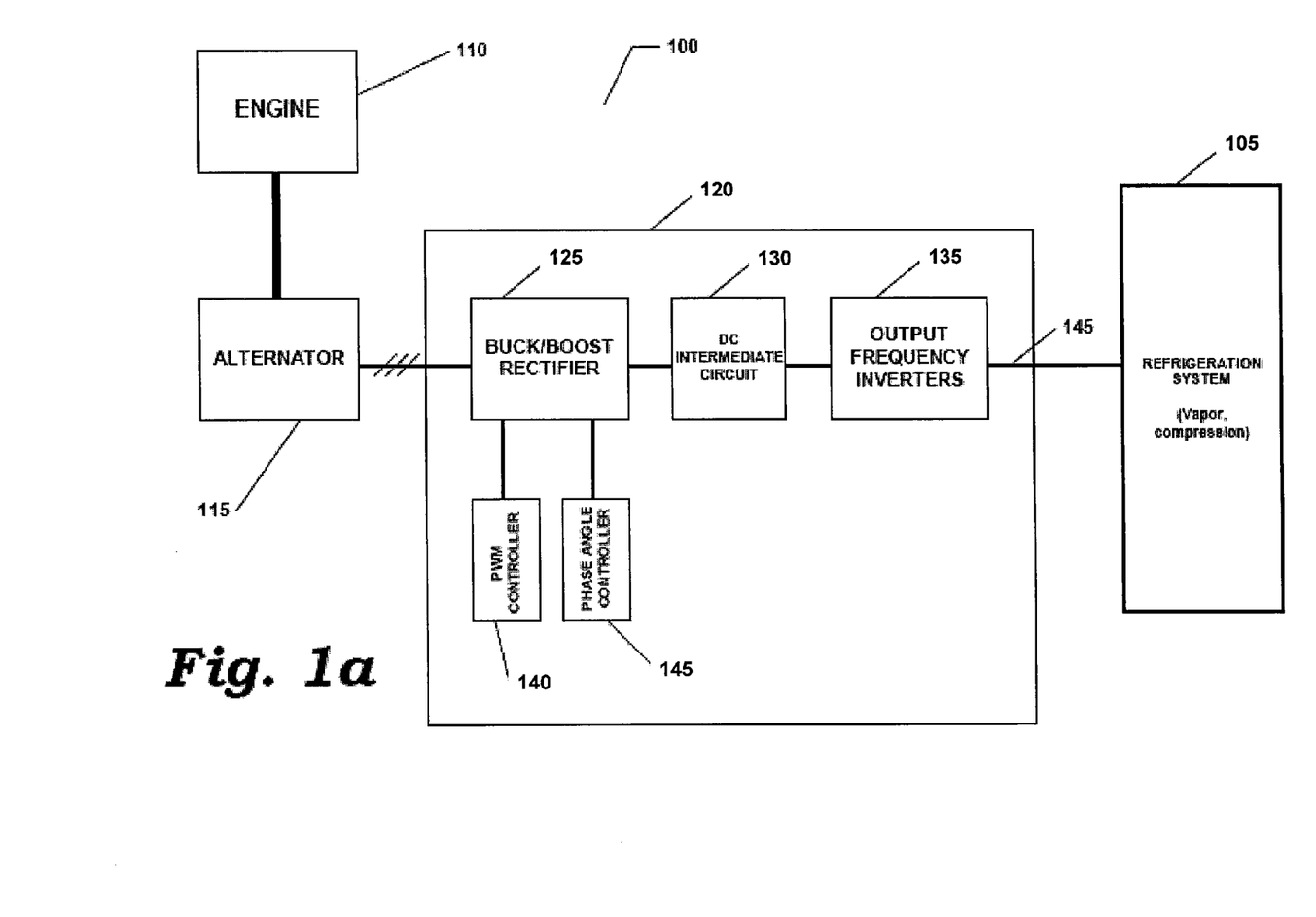
FIG. 1a is a block diagram of a first construction of an electrical system for a refrigeration unit.

FIG. 1a shows a supply system 100 for providing power to a refrigeration unit 105 (e.g., for a refrigerated truck or trailer). The system 100 includes an engine 110 driving an alternator 115 (e.g., by a belt). The alternator 115 produces three-phase AC power, which is provided to a power converter 120. The power converter 120 includes a buck/boost rectifier 125, a DC intermediate circuit 130, and an output frequency inverter 135. The buck/boost rectifier 125 is controlled by a PWM controller 140 and a phase angle controller 145. The power converter 120 converts the AC power to a DC power 145 suitable for the refrigeration unit 105. The three-phase AC power varies in frequency and voltage based upon the rotational speed of the engine. The frequency of the AC power varies by the relationship Revolutions per Minute=120×Frequency/Number of poles Thus, a six-pole alternator coupled to an engine that operates from 600 rpm to 4000 rpm would produce an output AC signal having a range of frequencies of 30 Hz to 200 Hz. The voltage of the AC signal also varies based on the speed of the engine. In some constructions, the voltage can range from about 150 volts to about 600 volts.

Figure 1B:
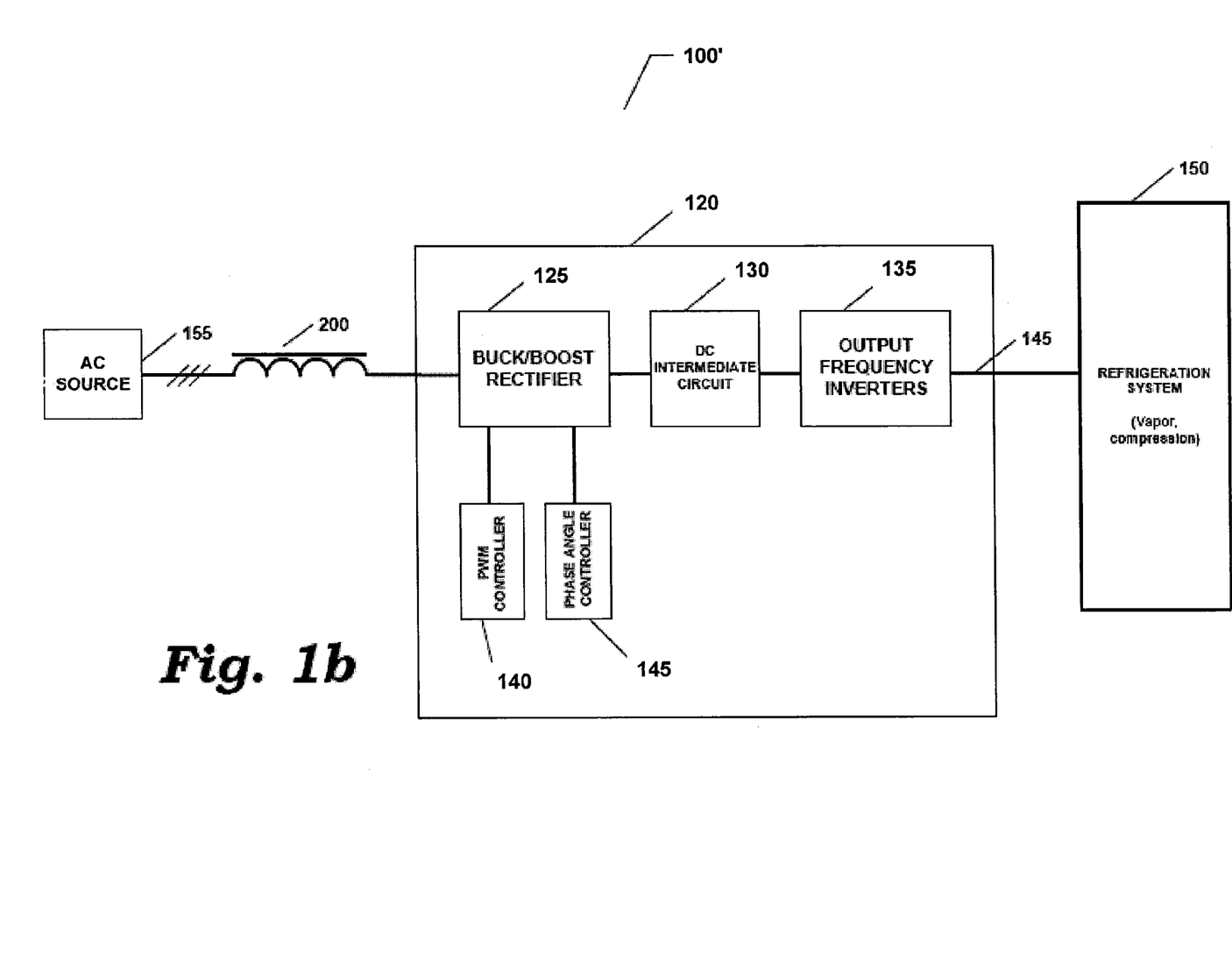
FIG. 1b is a block diagram of a second construction of an electrical system for a refrigeration unit.

FIG. 1b shows an alternate construction of a supply system 100'. In this construction, the three-phase AC power is supplied by a secondary source 155 (e.g., shore power) instead of the alternator 115. The power converter 120 of FIG. 1a uses the inductance of the alternator 115 to convert the three-phase AC power in the DC power 145 for the refrigeration unit 105. When the power is supplied by a secondary source, the system 100' requires the addition of accumulation chokes 200 to provide this inductance.

Figure 2:
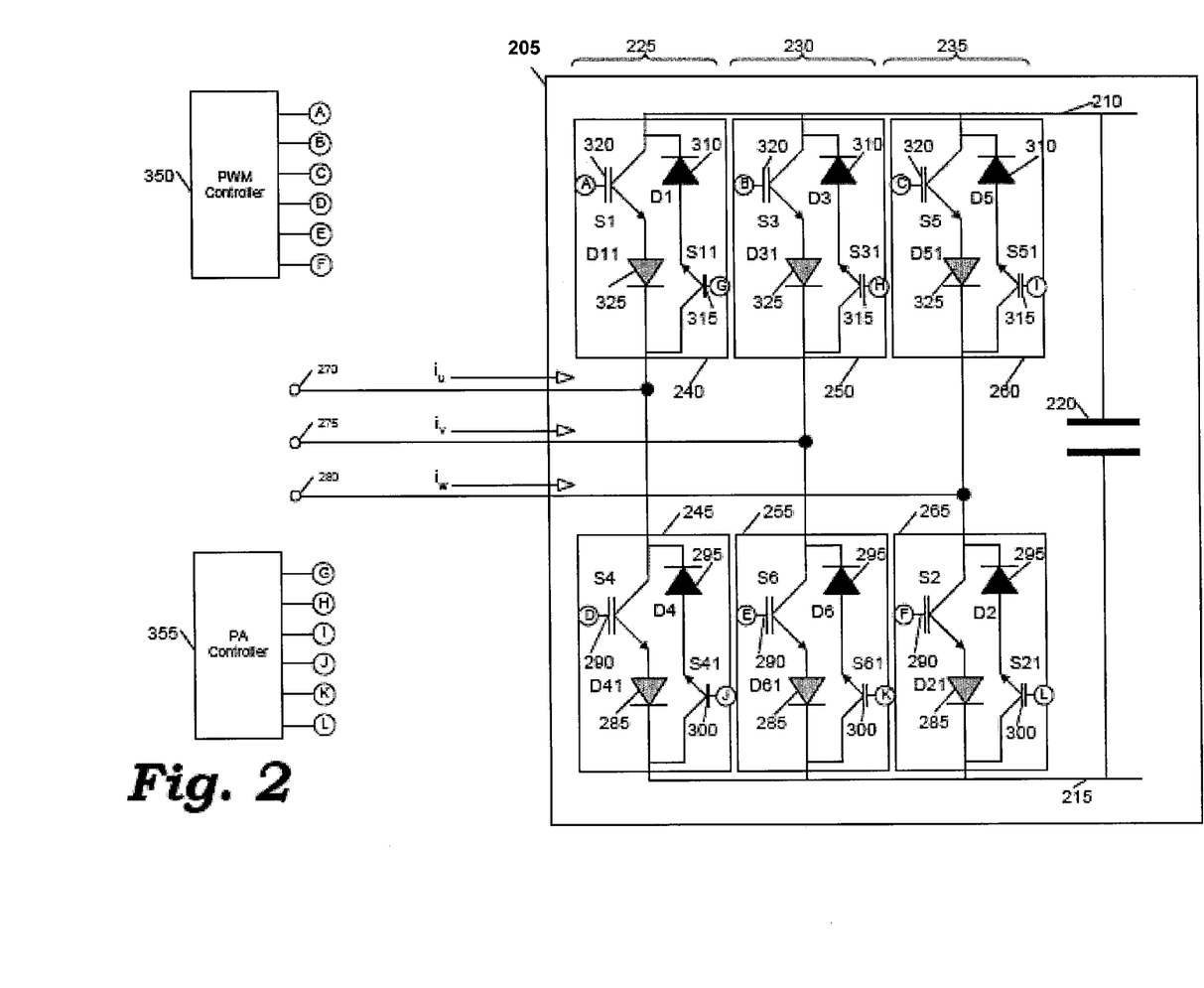
FIG. 2 is a schematic diagram of a full-controlled buck/boost rectifier, a phase angle controller, and a PWM controller.
Figure 3:
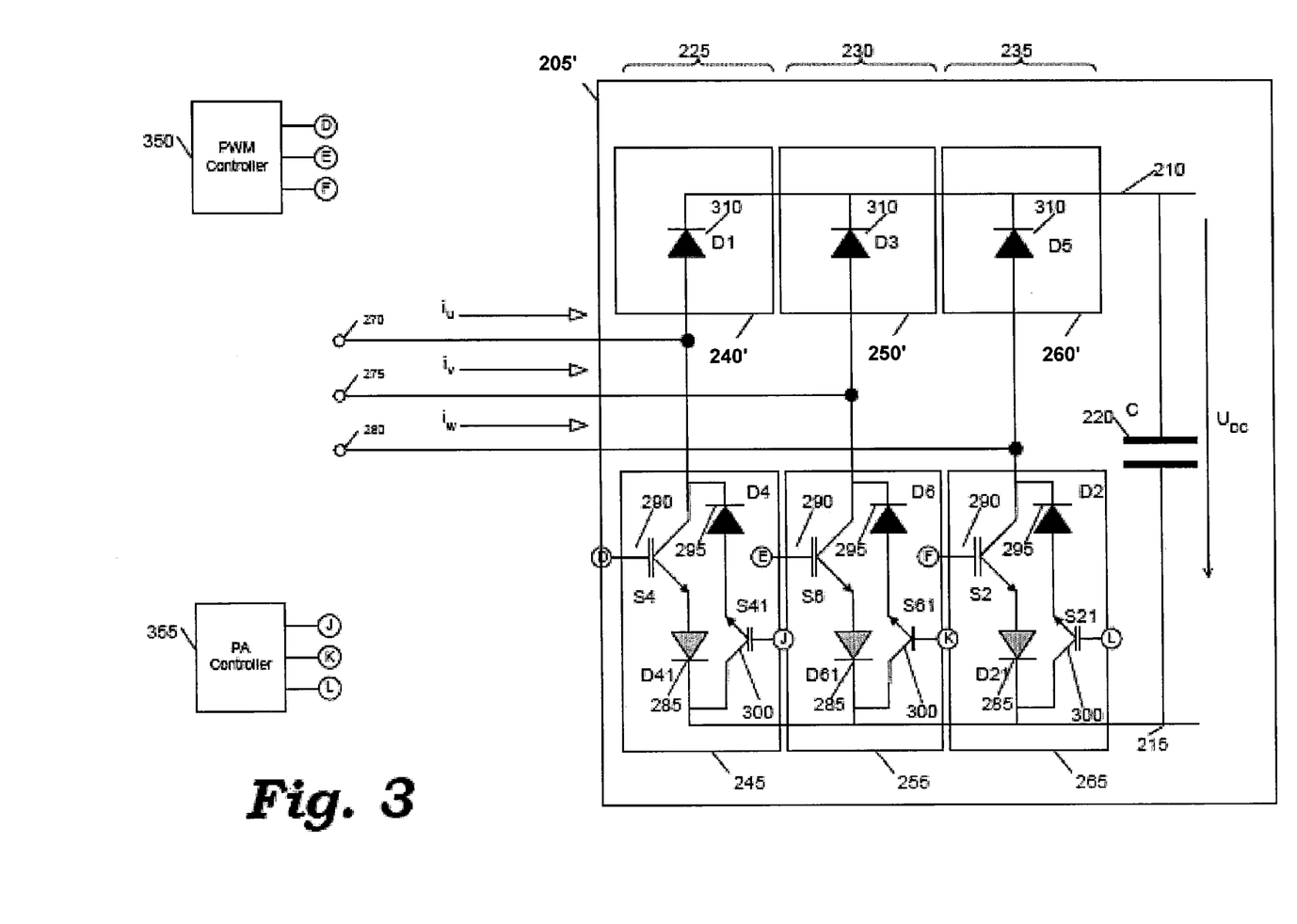
FIG. 3 is a schematic diagram of a first construction of a half-controlled buck/boost rectifier, a phase angle controller, and a PWM controller.
Figure 4:
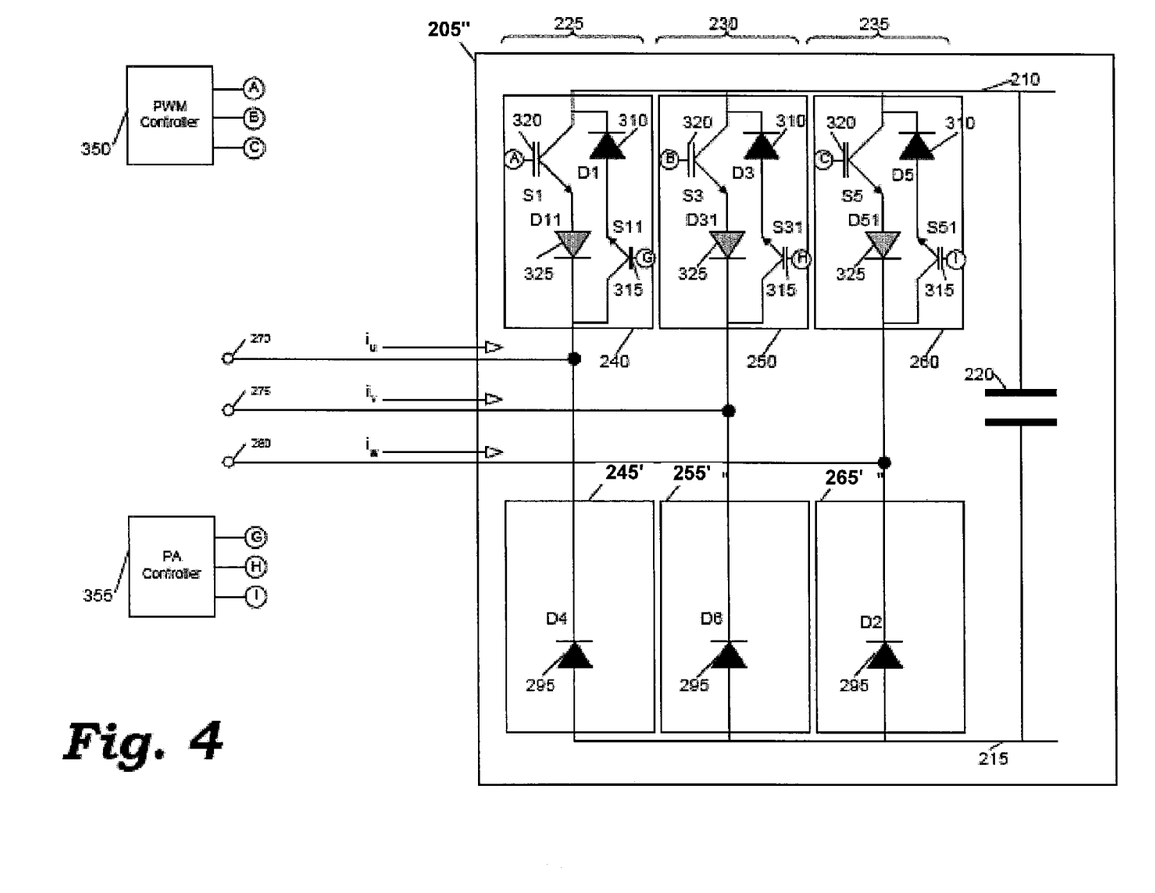
FIG. 4 is a schematic diagram of a second construction of a half-controlled buck/boost rectifier, a phase angle controller, and a PWM controller.

Referring to FIGS. 2, 3, and 4, the three-phase AC power is provided to the buck/boost rectifier 125 from an accumulation choke 200 or the alternator 115. The buck/boost rectifier 125 can be a full-controlled PWM rectifier 205 (FIG. 2) or a half-controlled PWM rectifier 205' (FIG. 3) or 205" (FIG. 4).

The rectifiers 205 include a first (or upper) DC bus 210 and a second (or lower) DC bus 215 across a capacitor 220. Each rectifier 205 also includes a first-phase rectifier 225, a second-phase rectifier 230, and a third-phase rectifier 235. The first-phase rectifier 225 has an upper rectifier 240 and a lower rectifier 245, both of which are electrically connected in a series-type relationship between the first DC bus 210 and the second DC bus 215. The term "series-type" relationship is used herein since the connection is not a strict series electrical connection where all current through the upper rectifier 240 passes through the lower rectifier 245. The second-phase rectifier 230 has an upper rectifier 250 and a lower rectifier 255, both of which are electrically connected in a series-type relationship between the first DC bus 210 and the second DC bus 215. The third-phase rectifier 235 has an upper rectifier 260 and a lower rectifier 265, both of which are electrically connected in a series-type relationship between the first DC bus 210 and the second DC bus 215.

A first phase input 270 is connected between the upper and lower phase rectifiers 240 and 245 of the first-phase rectifier 225. A second phase input 275 is connected between the upper and lower phase rectifiers 250 and 255 of the second-phase rectifier 230. A third phase input 280 is connected between the upper and lower phase rectifiers 260 and 265 of the third-phase rectifier 235.

The lower rectifiers 245, 255, and 265 of the full-controlled PWM rectifier 205 (FIG. 2) and the half-controlled PWM rectifier 205' (FIG. 3) include a respective switch 290. In the construction shown, the switch 290 is an insulated gate bipolar transistor (IGBT) having a collector coupled to a respective upper phase rectifier 240, 250, or 260 and an emitter coupled to the second DC bar 215 via diode 285. Each lower rectifier 245, 255, and 265 also includes a diode 295 having a cathode coupled to a respective IGBT 290 collector, and an anode coupled to an emitter of a respective second switch 300. Again, in the construction shown, the second switch 300 is an IGBT. A collector of the second IGBT 300 is coupled to the second DC bus 215.

The lower rectifiers 245', 255', and 265' (FIG. 4) of the half-controlled PWM rectifier 205" each include a respective diode 295 having a cathode coupled to the respective upper rectifiers 240, 250, or 260, and an anode coupled to the second DC bus 215. The lower rectifiers 245', 255', and 265' do not include any switches.

The upper rectifiers 240, 250, and 260 (FIG. 2) of the full-controlled PWM rectifier 205 and the half-controlled PWM rectifier 205" (FIG. 4) each include a respective diode 310 having an anode coupled to their respective lower rectifiers 245, 255, or 265, and a cathode coupled to an emitter of a respective switch 315. In the construction shown, the switch 315 is an IGBT. A collector of the IGBT 315 is coupled to a respective lower rectifier 245, 255, or 265. In addition, a second switch (e.g., an IGBT) 320 is coupled between the first DC bus 210 and the respective lower rectifier 245, 255, and 265, its emitter coupled to the respective lower rectifier 245, 255, or 265 via diode 325, and its collector coupled to the first DC bus 210.

The upper rectifiers 240', 250', and 260' (FIG. 3) of the half-controlled PWM rectifier 205' each include a respective diode 310 having an anode coupled to the respective lower rectifiers 245, 255, or 265, and a cathode coupled to the first DC bus 210. The upper rectifiers 240', 250', and 260' do not include any switches.

The rectifiers 205 are controlled by a PWM controller 140 and a phase angle (PA) controller 145. In the construction shown, the controllers 350 and 355 monitor the power received from the alternator 115, and control the rectifiers 205 to output about 500 volts DC (e.g., 450 VDC to 550 VDC). The PWM controller 140 drives the gates of the IGBTs 290 and 320 in a known manner to work in combination with the accumulator chokes 200 to boost the output voltage when the monitored input voltage is not sufficient to generate the desired 500 VDC output voltage via rectification alone.

The PA controller 145 drives the gates of the IGBTs 300 and 315 to control the phase angle of the input voltage, and to reduce (i.e., buck) the output voltage when the monitored input voltage has a magnitude, that if left unchecked, would result in an output voltage above 500 VDC.

Figure 5A:
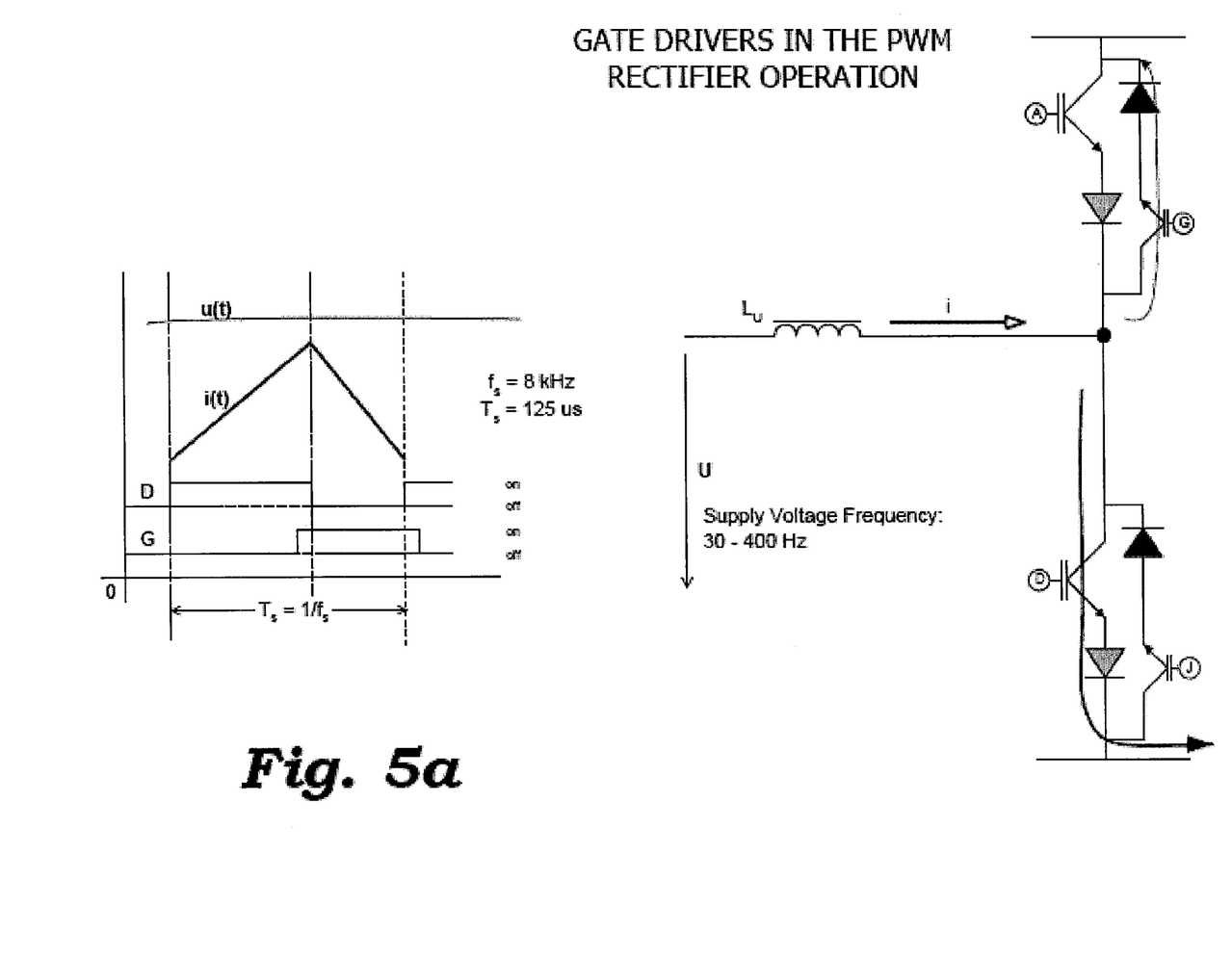
FIGS. 5a and 5b show the operation of a full-controlled buck/boost rectifier operating in a boost mode.
Figure 5B:
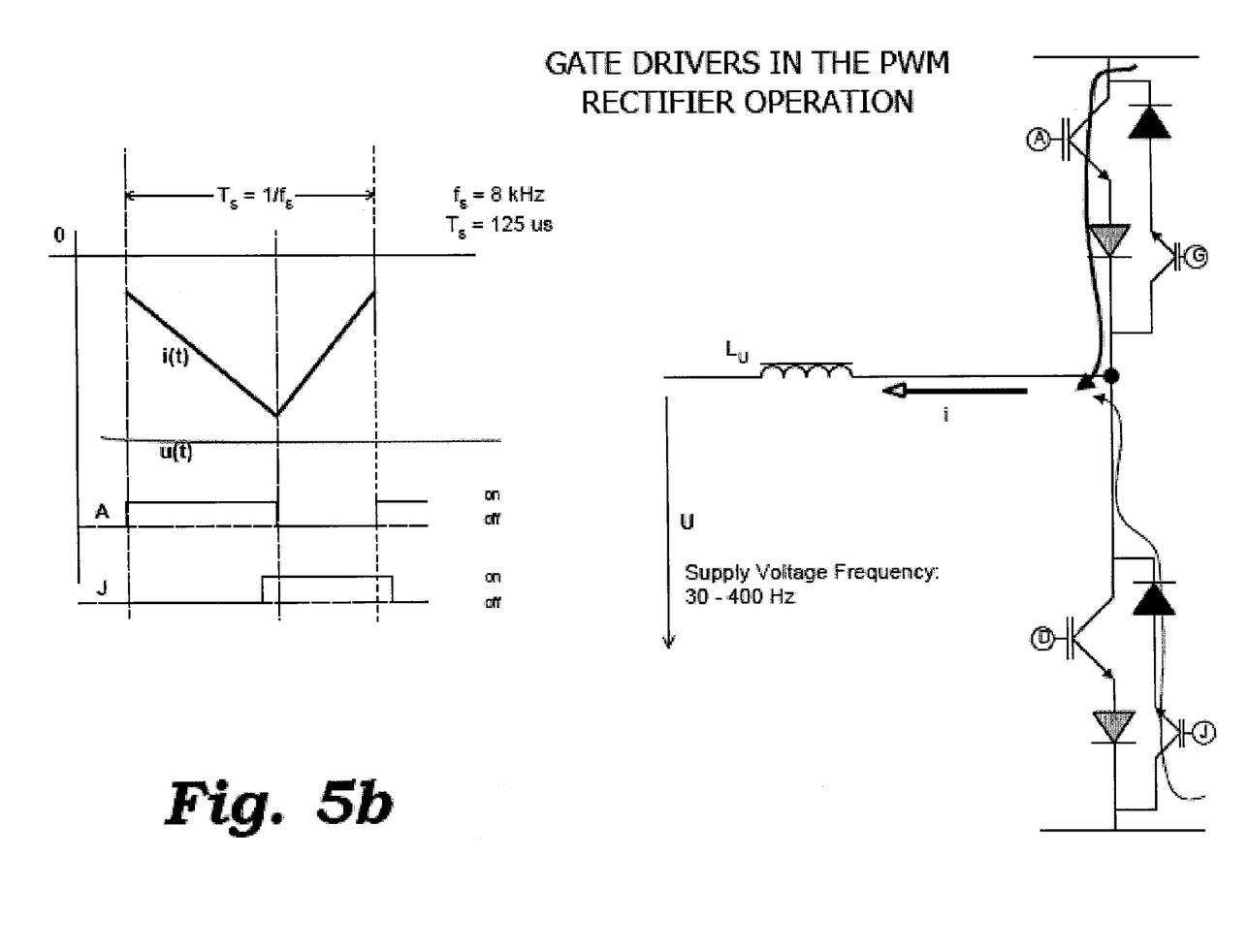

FIGS. 5a and 5b show an embodiment of the operation of the PWM controller 140 and the phase angle controller 145 for the rectifier 225 to boost the output of the U phase input voltage. During the positive cycle of the U phase input voltage, the PWM controller 140 provides a PWM signal D to the gate of the IGBT 290 and the phase angle controller 145 provides a PWM signal G to the gate of IGBT 315 of the rectifier 225 as shown in FIG. 5a. In the embodiment shown, the PWM signals D and G have a frequency equal to the carrier frequency of the rectifier 125 (e.g., 8 kHz). The U phase input voltage has a frequency between about 30 and 400 Hz. When the PWM signal D at the gate of IGBT 290 is on, current flows through IGBT 290 to the second DC bus 215. When the PWM signal D at the gate of IGBT 290 is off and the PWM signal G at the gate of IGBT 315 is on, current flows to the first DC bus 210 through the IGBT 315, boosting the voltage across capacitor 200.

Similarly, during the negative cycle of the U phase input voltage, the PWM controller 140 provides a PWM signal A to the gate of the IGBT 320 and the phase angle controller 145 provides a PWM signal J to the gate of IGBT 300 of the rectifier 225 as shown in FIG. 5b. Again, in the embodiment shown, the PWM signals A and J have a frequency equal to the carrier frequency of the rectifier 125 (e.g., 8 kHz), and the U phase input voltage has a frequency between about 30 and 400 Hz. When the PWM signal A at the gate of IGBT 320 is on, current flows through IGBT 320 to the first DC bus 210. When the PWM signal A at the gate of IGBT 320 is off and the PWM signal J at the gate of IGBT 300 is on, current flows to the second DC bus 215 through the IGBT 300, boosting the voltage across capacitor 200.

The PWM controller 140 and the phase angle controller 145 control rectifiers 230 and 235 in a similar manner for the V and W phase input voltages. The resulting DC voltage across the capacitor 200 is boosted relative to the three-phase input voltage.

Figure 6A:
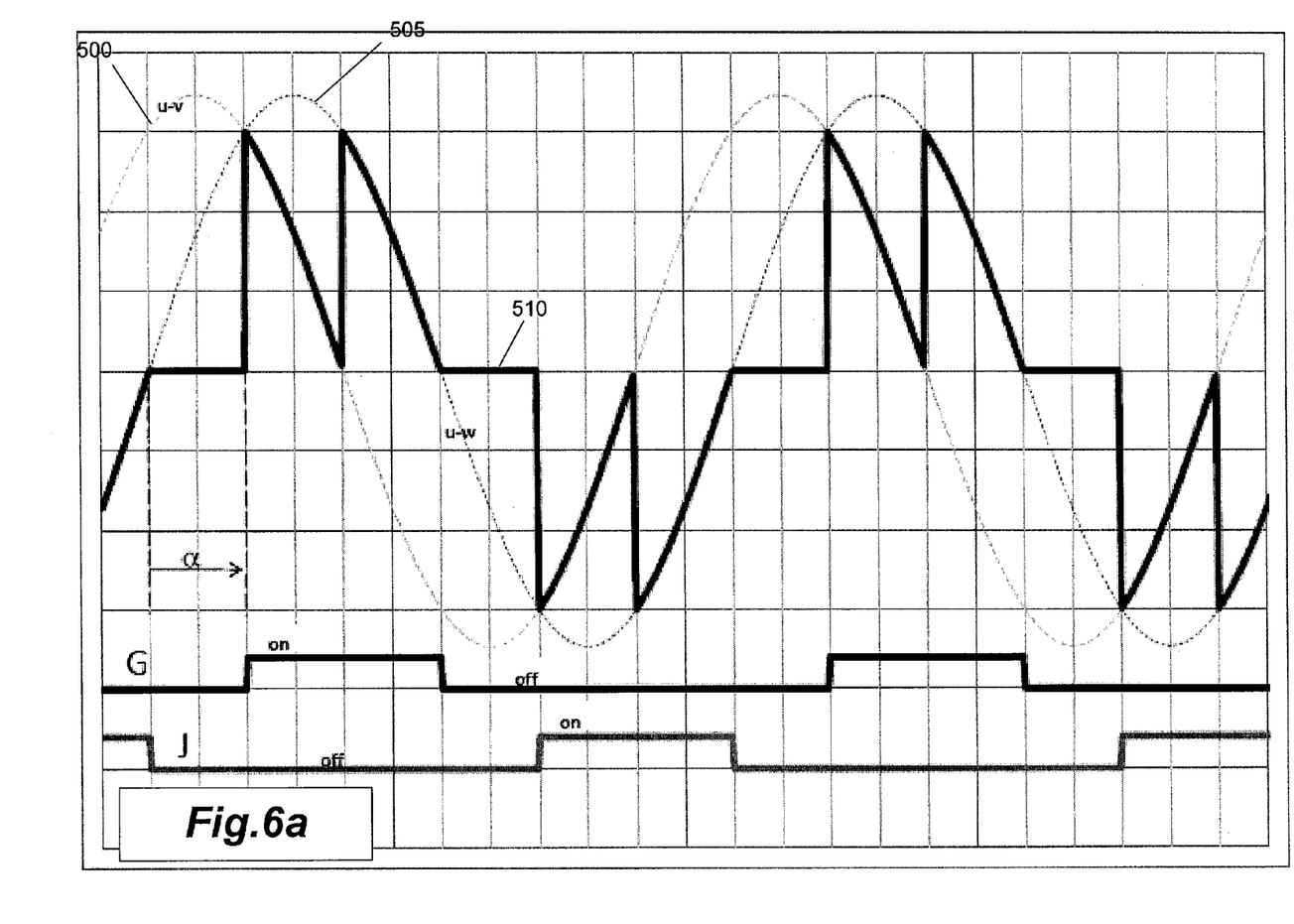
Figure 6B:
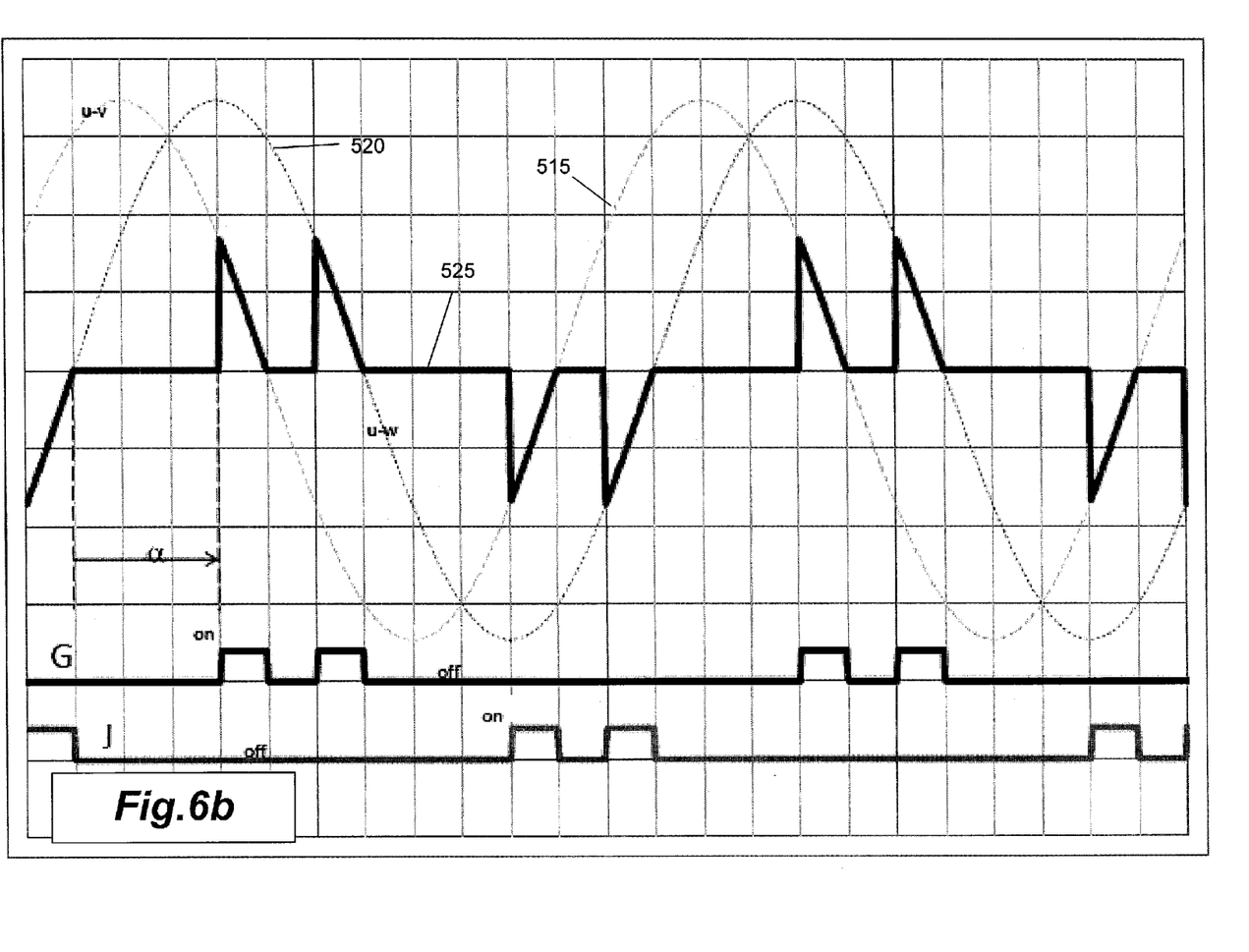

FIGS. 6a and 6b show the reduced output of the rectifier 225 as a result of two embodiments of phase angle control. FIG. 6a shows an embodiment of 60° phase angle control and FIG. 6b shows an embodiment of 90° phase angle control. During phase angle control, the PWM controller 140 turns off the gates of IGBTs 290 and 320 (signals D and A), and the phase angle controller 145 controls the gates of IGBTs 300 and 315 (signals J and G) as shown in the figures. For the 60° phase angle control shown, the phase angle controller 145 drives the gate of the IGBT 315 (signal G) on for the last 60° of the positive cycle of the U-V voltage 500 and the last 60° of the positive cycle of the U-W voltage 505. In addition, the phase angle controller 145 drives the gate of the IGBT 300 (signal J) on for the last 60° of the negative cycle of the U-V voltage 500 and the last 60° of the negative cycle of the U-W voltage 505. The resulting reduced voltage output 510 of the rectifier 225 is shown in FIG. 6a.

The other switch pairs—inputs H/K and I/L—are driven in a similar manner 120° and 240° out of phase with the G/J switch pair.

For 90° phase angle control, the phase angle controller 145 drives the gate of the IGBT 315 (signal G) on for the last 30° of the positive cycle of the U-V input voltage 515 and the last 30° of the positive cycle of the U-W input voltage 520. In addition, the phase angle controller 145 drives the gate of the IGBT 300 (signal J) on for the last 30° of the negative cycle of the U-V input voltage 515 and the last 30° of the negative cycle of the U-W input voltage 520. The resulting reduced voltage output 525 of the rectifier 225 is shown in FIG. 6b.

The PWM controller 140 and the phase angle controller 145 control rectifiers 230 and 235 in a similar manner for the V and W phase input voltages, reducing the effective DC voltage across capacitor 200.

Various features and advantages of the invention are set forth in the following claims.

What is claimed is:

1. A buck/boost rectifier connectable to an alternating current power source, the rectifier comprising:
   an upper bus;
   a lower bus;
   an upper rectifier coupled to the upper bus;
   a lower rectifier coupled in a series-type relationship with the upper rectifier between the upper bus and the lower bus;
   a pulse-width-modulation (PWM) controller coupled to the lower rectifier and configured to boost a direct current (DC) voltage output by the rectifier; and
   a phase-angle (PA) controller coupled to the lower rectifier and configured to buck the DC voltage output by the rectifier.

2. The rectifier of claim 1, wherein the rectifier is configured to output about 250 to about 750 volts DC.

3. The rectifier of claim 1, wherein the AC power varies from about 30 to about 400 Hertz.

4. The rectifier of claim 1, wherein the AC power varies from about 150 to about 600 volts.

5. The rectifier of claim 1, wherein the AC power source is a belt-driven alternator.

6. The rectifier of claim 1, wherein the AC power is three-phase power.

7. The rectifier of claim 6, further comprising:
   a second upper rectifier coupled to the upper bus;
   a third upper rectifier coupled to the upper bus;
   a second lower rectifier coupled in a series-type relationship with the second upper rectifier and to the lower bus;
   a third lower rectifier coupled in a series-type relationship with the third upper rectifier and to the lower bus;
   a second accumulator choke coupled between the second upper rectifier and the second lower rectifier; and
   a third accumulator choke coupled between the third upper rectifier and the third lower rectifier, the second accumulator choke configured to receive the second phase of the AC power, and the third accumulator choke configured to receive the third phase of the AC power.

8. The rectifier of claim 1, wherein the upper rectifier includes a diode, an anode of the diode coupled to the lower rectifier and a cathode of the diode coupled to the upper bus.

9. The converter of claim 1, wherein the lower rectifier includes a diode, an anode of the diode coupled to the lower bus and a cathode of the diode coupled to the upper rectifier.

10. The converter of claim 1, wherein the upper rectifier includes a first diode, a first insulated gate bipolar transistor (IGBT), and a second IGBT and second diode, a cathode of the first diode coupled to the lower rectifier, an anode of the first diode coupled to a emitter of the first IGBT, an collector of the first IGBT coupled to the upper bus, an emitter of the second IGBT coupled to the anode of the second diode, cathode of the second diode connected to the upper bus, and a collector of the second IGBT coupled to the lower rectifier.

11. The converter of claim 1, wherein the lower rectifier includes a first diode, a first insulated gate bipolar transistor (IGBT), and a second IGBT and second diode, a cathode of the first diode coupled to the lower bus, an anode of the first diode coupled to a emitter of the first IGBT, an collector of the first IGBT coupled to the upper rectifier, an emitter of the second IGBT coupled to the anode of the second diode, cathode of the second diode connected to the upper rectifier, and a collector of the second IGBT coupled to the lower bus.

12. The rectifier of claim 1, wherein the PWM controller boosts the output voltage when the AC voltage is not sufficient for the rectifier to output about 300 to about 800 VDC.

13. The rectifier of claim 1, wherein the PA controller bucks the output voltage when the AC voltage has a magnitude that would cause the rectifier to output more than about 300 to about 80VDC.

14. The rectifier of claim 1, wherein the PWM controller and the PA controller are coupled to the upper rectifier.

15. The rectifier of claim 1, wherein the rectifier is coupled to an alternator driven by an engine, and the rectifier powers a refrigeration unit.

16. The rectifier of claim 15, wherein the refrigeration unit is part of a trailer.

17. The rectifier of claim 15, wherein the alternator provides three-phase AC power to the buck/boost rectifier.

18. The rectifier of claim 17, further comprising a second upper rectifier coupled to the upper bus, a third upper rectifier coupled to the upper bus, a second lower rectifier coupled in a series-type relationship with the second upper rectifier and to the lower bus, and a third lower rectifier coupled in a series-type relationship with the third upper rectifier and to the lower bus, a second accumulator choke coupled between the second upper rectifier and the second lower rectifier, and a third accumulator choke coupled between the third upper rectifier and the third lower rectifier, the second accumulator choke configured to receive the second phase of the AC power, and the third accumulator choke configured to receive the third phase of the AC power.

19. A method of providing DC power to a refrigeration unit, the method comprising:
   receiving three-phase AC power from a belt-driven alternator;
   rectifying the AC power into DC power;
   boosting the DC power when the AC power is not sufficient to produce DC power having a voltage that exceeds a threshold by rectifying alone;
   bucking the DC power when the AC power has a magnitude which would produce a DC voltage that exceeds a second threshold when rectified alone; and
   wherein the boosting act is performed by PWM control, and the bucking act is performed by phase-angle control.

20. The method of claim 19, wherein the threshold and the second threshold are about 300 to about 80VDC.

* * * * *